Patented May 26, 1953

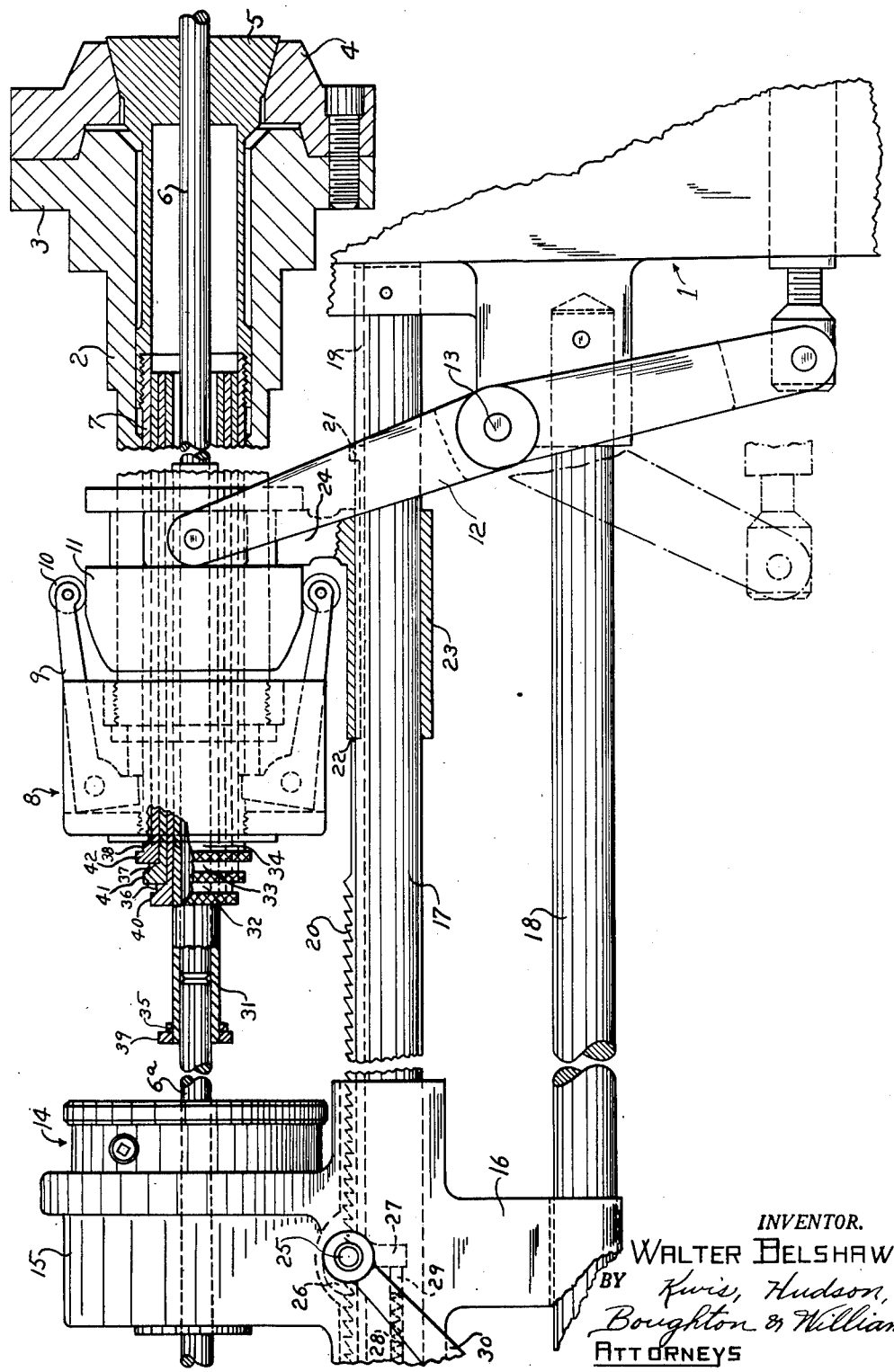

2,639,494

UNITED STATES PATENT OFFICE 2,639,494

MACHINE TOOL

Walter Belshaw, Seattle, Wash., assignor to The Warner & Swasey Company, Cleveland, Ohio, a corporation of Ohio Application March 16, 1948, Serial No. 15,142

2 Claims. (Cl. 29—59)

This invention relates to machine tools and more particularly to an improved mechanism for feeding bar stock to a machine tool.

When employing a conventional machine tool for operating upon bar stock it frequently happens that the bar stock is of materially smaller diameter than the bore in the machine tool spindle. When this occurs, the portion of the stock between the machine tool chuck and the bar feeding chuck is unsupported and hence tends to whip about and strike against the walls of the spindle bore. This causes highly objectionable vibrations and noise with resulting inaccuracies in the machining operations. This whipping of the bar stock is accentuated when the stock has become too short to be further supported by the bar feeding chuck so that the stock is then only supported by the chuck on the spindle, the outer end of the stock being unsupported. Moreover, when the stock is too short to be gripped by the bar feeding mechanism further feeding thereof must be effected either by hand or by employing a pusher bar, or a new piece of stock in the chuck of the bar feeding mechanism to abut the short piece of stock and thus cause it to be fed when the feeding mechanism is actuated. Feeding by hand is relatively slow and difficult while the use of a pusher bar or a new piece of stock to push a separate piece of stock is not entirely satisfactory due to the difficulty of securing and maintaining alignment between the ends of the short piece of stock held in the machine tool chuck and the pusher bar or new piece of stock in the feeding mechanism, this difficulty being intensified by the above mentioned whipping of the stock.

The principal object of this invention is, therefore, to provide a machine tool for operating upon bar stock with an improved means for feeding the stock and for supporting the stock while being fed whereby whipping of the stock is prevented and the feeding of short pieces of stock is facilitated.

A more specific object of the invention is to provide an improved liner tube for the spindle of a machine tool, adapted to operate upon bar stock, which tube telescopes within the bore of the spindle and may be partially withdrawn to support the stock both interiorly and exteriorly of the spindle and to align the stock with a succeeding piece of bar stock.

Another object of the invention is to provide an improved liner tube of the type mentioned in the preceding object with a means to limit movement of the liner tube inwardly of the machine tool spindle.

A further object of the invention is to provide a machine tool, adapted to operate upon bar stock, with a plurality of liner tubes telescopically arranged within the spindle of the machine tool, the number and diameters of said tubes being such that the inner tube guides and supports stock of relatively small diameter and sequential removal of each tube renders the next succeeding tube effective to support and guide stock of larger diameter, the said tubes each having a portion extending exteriorly of said spindle with the several said portions extending different distances so that one or more of the tubes in the spindle may be readily grasped and partially withdrawn to provide a support for bar stock both interiorly and exteriorly of said spindle and to hold a relatively short piece of stock, which is positioned in the machine tool, in alignment with a succeeding piece of stock being fed thereto.

The invention further resides in certain novel features of construction and combination and arrangement of parts, and further objects and advantages thereof will be apparent to those skilled in the art to which it pertains from the following description of the present preferred embodiment thereof described with reference to the accompanying drawing.

The single figure of the drawing shows a portion of a machine tool adapted to operate upon bar stock, the bar feeding mechanism being shown in side elevation and portions of the headstock being broken away to more clearly illustrate the hollow spindle of the machine tool with the improved liner tubes positioned therein.

In the drawing, the headstock of a machine tool is designated generally by the reference numeral 1. This headstock is provided with the usual hollow spindle 2 which is rotatably supported in the headstock and driven by conventional driving means not here shown. The forward portion of the spindle 2 is provided with an integral flange 3 to which is attached the nose member 4 of a suitable work holding chuck, here illustrated as being of the pull-back collet type. As is well known in the art, the nose 4 has a frusto-conically shaped opening therein within which is positioned a correspondingly frusto-conically shaped collet 5 which has the usual resilient jaws for cooperation with bar stock 6.

The inner end of the collet 5 is connected with a collet actuating sleeve 7 which extends through the bore of the spindle 2 and is provided with a finger housing, generally designated 8. Within the finger housing are pivotally supported a plurality of collet actuating fingers 9 in the form of bell crank levers, the shorter arms of which abut the rear end of the spindle 2, the other arms of the levers or fingers being provided with the usual rollers 10 for cooperation with an actuating cone 11. The cone 11 is slidably mounted upon a portion of the spindle 2 and is provided in the well known manner with an actuating lever 12 which is pivoted at 13 to a bracket mounted upon the headstock 1. The lever is rocked about its pivot 13 by any conventional mechanism not herein shown in detail but which is pivotally attached to the lower end of the lever 12.

It will be readily understood that when the lever 12 is in its broken line position, the actuating cone 11 will be positioned to the right of the location shown in the drawing so that the fingers 9 move radially inward due to the natural resiliency of the jaws of the collet 5 which causes the latter to move outwardly with respect to the nose 4 so that the actuating sleeve 7 moves the finger housing 8 to the right as viewed in the drawing. Since the fingers or levers 9 are pivoted in the housing 8 they are carried with the housing with the result that their substantially radially extending arms are rocked to bring the outer arms closer to the spindle 2. Rocking of the lever 12 in the opposite direction moves the cone 11 to the left as viewed in the drawing to the position shown in full lines. Consequently, the fingers 9 are rocked in a radially outward direction, the abutment of the radial arms of the fingers with the end of the spindle 2 acting as a fixed pivot so that the finger housing 8 is moved to the left carrying with it the collet actuating sleeve and the collet 5. During this movement, the collet is engaged with the bar stock 6 positioned therein and firmly grips the latter for a machining operation.

Bar stock is fed to the chuck by a conventional feeding mechanism comprising a feed chuck generally designated 14 which is rotatably supported in a housing 15, the latter being longitudinally movable towards and away from the headstock 1. For this purpose the housing 15 is provided with a downwardly extending bracket portion 16 which is supported upon parallel, vertically spaced rods 17 and 18 carried by the bracket on the headstock 1 and by a supporting standard not shown. The upper surface of the rod 17 is provided with a longitudinally extending keyway 19 in which is slidably disposed a ratchet bar 20. This bar 20 is provided with ratchet teeth over the principal portion of its length, the teeth, however, being omitted adjacent the forward portion to provide a planar surface which terminates in an upwardly extending integral shoulder 21. This planar portion of the ratchet bar has two sections of different elevations thereby providing a second integral shoulder 22 spaced rearwardly from the previously mentioned shoulder 21. Slidably disposed upon the rod 17 and upon this reduced elevation portion of the ratchet bar 20 for movement between the shoulders 22 and 21, is a sleeve 23 which is integral with or connected to an upwardly extending projection 24 positioned within the circumferential groove of the collet actuating cone 11. Consequently, when the collet actuating cone 11 is moved, the sleeve 23 is correspondingly moved longitudinally upon the rod 17 and, at the limits of its movement between the shoulders 21 and 22, it abuts these shoulders to impart movement to the ratchet bar 20.

Pivotally mounted within the housing 15 is a shaft 25 upon which is mounted a ratchet pawl 26 which cooperates with the teeth on the ratchet bar 20. Extending radially from the shaft 25 and connected therewith is a lug or shoulder 27 upon which a compression spring 28 continuously exerts its force, a plug 29 being interposed between the spring and the lug or bracket 27. Consequently, the pawl 26 is continuously urged in a direction for engagement with the teeth on the ratchet bar 20. Exteriorly of the housing 15 the shaft 25 is provided with an operating handle 30 by which the shaft may be rocked against the force exerted by the spring 28 and thereby release the pawl 26 from engagement with the teeth on the ratchet bar 20. The construction is such that when the sleeve 23 is moved to the left as shown in the drawing, thereby effecting gripping of the collet chuck, the said sleeve strikes the shoulder 22 and moves the ratchet bar 20 to the left, the pawl 26 latching over the teeth of the ratchet bar at this time. When the lever 12 is operated to effect release of the collet chuck, movement of the finger actuating cone 11 carries the sleeve 23 to the right as shown in the drawing so that the latter, after the release of the collet chuck, strikes the abutment 21 and moves the ratchet bar 20 to the right. The parts are so proportioned that the finger actuating cone 11 has a sufficient movement for effecting complete disengagement of the collet chuck before the ratchet bar 20 is moved as just mentioned. Consequently, the bar stock 6 is not held by the chuck when the ratchet bar 20 is moved to the right so that this movement acting, through the pawl 26, housing 15 and feed chuck 14, is effective to feed the bar stock 6 through the spindle 2 and collet 5 a predetermined distance. This operation is well known in the art and hence need not be further elaborated.

As will be seen in the drawing, the bar stock 6 which is positioned in the collet chuck is of relatively small diameter with respect to the diameter of the bore in the spindle 2 and the outer end of this piece of bar stock terminates relatively close to the rear of the finger housing 8 so that the bar stock feeding mechanism is no longer effective to directly effect further feeding of this piece of stock. Consequently, such a piece of stock presents the problems mentioned above with respect to whipping and difficulty of feeding which difficulties, however, are obviated by the novel liner tubes about to be described.

In accordance with this invention, the bore of the spindle 2 is provided with one or more liner tubes. In the illustrated embodiment four such tubes 31, 32, 33 and 34 are illustrated, the tubes being telescoped within each other and within the collet actuating sleeve 7 so that they are telescopically disposed within the bore of the spindle, it being remembered that the actuating sleeve is also within the spindle bore. These liner tubes are of material length and extend, when disposed at their innermost positions, closely adjacent the rear portion of the collet 5, or if desired, the inner ends of the tubes may be of sufficient length to extend within the collet 5 adjacent the head thereof, the number and diameters of the tubes being so selected that they support the bar stock 6 without excessive play or whipping therein. In other words, the number and diameters of the liner tubes employed is chosen in accordance with the diameter of the stock to be supported therein. For example, if stock of larger diameter than that illustrated is to be employed, the innermost liner tube 31 is completely removed from the spindle, and from the other tubes, so that the stock is supported in the next succeeding liner tube 32 and this may be repeated when successively larger diameter stock is employed or, conversely, the tubes are successively placed within the spindle for successively smaller diameter stock.

It will be observed that liner tubes 31 to 34 are freely slidable within the chuck actuating sleeve 7, and hence within the spindle bore, and, in order to facilitate either complete or partial withdrawal of the tubes therefrom, portions of the tubes are intended at all times to extend exteriorly of the spindle bore and of the finger housing 8. Therefore, each tube 31, 32, 33 and 34 is provided adjacent its outer end with an outwardly extending shoulder 35, 36, 37 and 38, respectively, which may be formed integrally with the tubes or as separate members attached thereto. These shoulders are of sufficient size so that they abut the outer end of the corresponding tube in which they are positioned, or the finger housing 8 in the case of the largest tube, thereby limiting the extent of inward movement of the tubes relative to each other and to the bore of the spindle. To facilitate withdrawal of the tubes they are each further provided, adjacent their outer ends, with enlarged ring-like members or shoulders 39, 40, 41 and 42, respectively, which may be either integral with or attached to the respective tubes and preferably have their peripheries knurled to facilitate handling. Consequently, the liner tubes may be readily inserted within or removed from the spindle bore to accommodate bar stock of different diameters so that the latter is guided and supported without excessive play and consequently without excessive whipping.

As mentioned before, and as illustrated in the drawing, the bar stock 6 is shown as being relatively short and as having been fed to a position such that the bar feeding mechanism is no longer effective to directly produce further feeding of the stock. In order that the entire length of the bar stock 6 may be employed, however, a new piece of bar stock 6a is shown positioned in the bar feeding chuck 14 said bar feeding chuck having been moved to its extreme left-hand position on the rod 17. Consequently, when the lever 12 is actuated to unchuck the bar stock 6, the bar feeding mechanism will, as was previously described, now move the bar stock 6a forwardly so that abutment between the forward end of the latter and the rear end of the short piece of the bar stock 6 causes corresponding feeding of the latter.

The alignment of the bar stock 6a and 6 is facilitated, in accordance with the present invention, by the fact that the liner tubes hold the bar stock 6 substantially concentric within the spindle bore and without excessive whipping. In addition, the innermost liner tube 31 is partially withdrawn exteriorly of the spindle bore so that the said liner tube sleeves over the two adjacent ends of the pieces of stock 6 and 6a thus positively holding the two pieces of stock in axial alignment, as is shown in the drawing. In addition to maintaining the pieces of bar stock in alignment, the tube 31 further assists in providing a relatively rigid support for the bar stock pieces 6 and 6a intermediate the bar feeding mechanism and the spindle. Moreover, since the bar stock 6 is supported by the collet chuck and the liner tubes, while the bar stock 6a is supported by the feeding chuck 14 and the tube 31, the two pieces of bar stock are in effect the same as one continuous piece supported in a manner to prevent excessive whipping. While only one liner tube 31 has been shown as partially withdrawn for effecting this support and alignment of the bar stock pieces 6 and 6a, it will be readily understood that one or more of the other liner tubes may also be partially withdrawn in the manner of movable sections of a telescope to thereby increase the rigidity of the support for the stock afforded by the liner tube 31 exteriorly of the spindle bore when there is a considerable space between the bar feeding chuck and the spindle end.

After the parts have been positioned as shown in the drawing, the piece of stock 6a is fed as previously described thereby pushing the piece of stock 6 through the collet until it has been completely machined. As the stock is thus fed, the liner tube or tubes which have been partially withdrawn from the spindle bore are sequentially returned to their innermost positions adjacent the rear of the finger housing 8 by the successive actuations of the bar feeding mechanisms. This results from the friction between the bar stock pieces 6, 6a and the liner tube or tubes, or if the latter be withdrawn sufficiently, by abutment between the forward face of the bar feeding chuck 14 and the rear ends of the tube or tubes. Consequently the pieces of stock 6 and 6a are continuously supported for axial alignment throughout the major portion of their movement through the spindle. When the piece of stock 6 has been entirely projected through the collet, the piece of stock 6a is immediately available therein for machining.

It will therefore be apparent that the invention provides a mechanism which facilitates the feeding of bar stock by enabling pieces of stock of different diameters to be easily supported against excessive whipping in the spindle bore and by effecting alignment between a relatively short piece of bar stock projecting externally of the spindle and a pusher bar or a succeeding piece of bar stock so that the automatic feeding of the stock may be continued until the entire length thereof has been utilized.

It is to be understood that the herein illustrated and described construction is intended as representative of but one practical embodiment of the invention and that various modifications and adaptations thereof may be effected by those skilled in the art. Thus, other types of chucks may be employed in place of the collet chuck illustrated and described in which event the actuating sleeve 7 would be omitted so that the liner tube or tubes would be directly supported by the spindle. Also, other types of stock feeding mechanism may be employed or feeding may be by hand if desired. Therefore, the invention is not to be considered as limited to the exact details of construction herein illustrated and described but only as required by the spirit and scope of the appended claims.

Having thus described the invention, I claim:

1. In a machine tool having a hollow spindle, a chuck carried by the forward end of said spindle adapted to grip bar stock fed through said spindle, a means for actuating said chuck to and from stock gripping positions, and a bar stock feeding mechanism spaced rearwardly from said spindle and actuated in timed relationship with actuation of said chuck in a manner such that bar stock is successively fed through said chuck and gripped thereby, the improvement which comprises a plurality of liner tubes telescopically arranged and axially slideable within each other and within said spindle, the number and diameters of said tubes being such that the inner tube guides and supports stock of relatively small diameter without material whipping and sequential removal of each tube renders the next succeeding tube effective to support and guide stock of larger diameter than that supported in the removed tube, the said tubes each having a portion extending exteriorly of said spindle at the rear end thereof with the several said portions extending different distances so that one or more of the said portions may be readily grasped and the corresponding tube or tubes partially withdrawn rearwardly from the bore of said spindle to thereby provide a support for bar stock both interiorly and exteriorly of said spindle, the inner of the partially withdrawn liner tubes being adapted to be sleeved over the adjacent ends of separate pieces of bar stock, respectively supported in said chuck and said feeding mechanism, so that the said separate pieces of stock are supported in axial alignment with the liner tube which has been partially withdrawn from the rear of said spindle the greatest distance being positioned for engagement by the said bar feeding mechanism as the latter feeds the stock forwardly to thereby progressively return the extended liner tubes inwardly of the spindle simultaneously with the continued feeding of the stock so that the adjacent ends of separate pieces of bar stock are continuously supported and aligned as they move towards and into said spindle.

2. In bar stock feeding mechanism for a machine tool having a hollow spindle provided with a stock gripping chuck, the combination of a liner tube telescopically positioned within the bore of said spindle and axially slideable therein with the said tube having an internal diameter such as to guide and support the stock therein for free sliding movement without material whipping, the said tube having a portion extending exteriorly of said spindle from the rear thereof whereby the said portion may be readily grasped and the tube partially withdrawn rearwardly from within said spindle to a desired extent to thereby provide a support for the stock both interiorly and exteriorly of said spindle, the said liner tube when partially withdrawn being adapted to be sleeved over the adjacent ends of separate pieces of bar stock respectively supported in the chuck and by a stock feeding mechanism spaced rearwardly of said chuck so that the said separate pieces of stock are supported in axial alignment by said liner tube and the latter is positioned for engagement by a portion of the bar feeding mechanism to effect return of the liner tube to its innermost position by successive operations of the bar feeding mechanism in moving the stock to and through said spindle, and means carried by the said extending portion to limit movement of the said liner tube inwardly of the bore of said spindle and to facilitate grasping the said extending portion for effecting sliding movement of said tube exteriorly of said spindle.

WALTER BELSHAW.

References Cited in the file of this patent
UNITED STATES PATENTS

| Number | Name | Date |
|---|---|---|
| 198,211 | Post | Dec. 18, 1877 |
| 545,312 | Rivett | Aug. 27, 1895 |
| 840,322 | Hartness | Jan. 1, 1907 |
| 1,019,542 | Smith | Mar. 5, 1912 |
| 1,454,643 | Hornberger | May 8, 1923 |
| 1,506,107 | Brophy | Aug. 26, 1924 |
| 1,765,362 | Berry | June 24, 1930 |
| 1,885,224 | Brinkman et al. | Nov. 1, 1932 |
| 2,035,354 | Van Hamersveld | Mar. 24, 1936 |
| 2,221,734 | Evans | Nov. 12, 1940 |
| 2,376,606 | Logan | May 22, 1945 |